(12) United States Patent
Provoost

(10) Patent No.: US 7,617,215 B2
(45) Date of Patent: Nov. 10, 2009

(54) METHOD AND ARRANGEMENT FOR SETTING UP AND UPDATING A USER INTERFACE FOR ACCESSING INFORMATION PAGES IN A DATA NETWORK

(75) Inventor: Bart Provoost, Berlaar (BE)

(73) Assignee: Siemens Aktiengesellschaft, Munich (DE)

( * ) Notice: Subject to any disclaimer, the term of this patent is extended or adjusted under 35 U.S.C. 154(b) by 464 days.

(21) Appl. No.: 10/530,144

(22) PCT Filed: Apr. 19, 2004

(86) PCT No.: PCT/EP2004/004148

§ 371 (c)(1),
(2), (4) Date: Mar. 31, 2005

(87) PCT Pub. No.: WO2004/099963

PCT Pub. Date: Nov. 18, 2004

(65) Prior Publication Data

US 2006/0041531 A1    Feb. 23, 2006

(30) Foreign Application Priority Data

May 8, 2003    (DE)    ................. 103 20 711

(51) Int. Cl.
*G06F 17/30* (2006.01)
*G06F 15/16* (2006.01)

(52) U.S. Cl. ........................................ 707/10; 709/245

(58) Field of Classification Search ...................... 707/3
See application file for complete search history.

(56) References Cited

U.S. PATENT DOCUMENTS 5,721,827 A * 2/1998 Logan et al. ................. 709/217
6,151,624 A * 11/2000 Teare et al. .................... 707/5

(Continued)

FOREIGN PATENT DOCUMENTS

WO    WO2004099963 A3 * 11/2004

OTHER PUBLICATIONS

Epixtech, "iPac System Administrator's Guide", Jan. 9, 2002, Epixtech Inc., Version 2.0.*

(Continued)

*Primary Examiner*—Khanh B Pham
*Assistant Examiner*—Joseph D Wong

(57) ABSTRACT

The aim of the invention is to establish and update a user interface allowing a user to access data pages in a data network. Said aim is achieved by the fact that selected data pages are made accessible to the user on the user interface by means of a display element while said data pages are accessed by accessing the respective display element, contents being stored on the data pages. An allocated set of content data, in which characteristics describing the respective content that is stored on the data page are stored, is created for the data pages. In order to determine the selected data pages, a set of user data is created by means of which a searched content is described. The sets of content data are compared with the set of user data regarding the degree of correspondence, and data pages in which the degree of correspondence between the respective set of content data and the set of user data reaches and/or exceeds a predefined threshold value are displayed on the user interface by means of display elements.

17 Claims, 2 Drawing Sheets

U.S. PATENT DOCUMENTS

| | | | |
|---|---|---|---|
| 6,209,027 B1 | 3/2001 | Gibson | |
| 6,256,639 B1 | 7/2001 | Himmel et al. | |
| 6,260,061 B1 * | 7/2001 | Krishnan et al. | 709/213 |
| 6,314,439 B1 | 11/2001 | Bates et al. | |
| 6,611,812 B2 * | 8/2003 | Hurtado et al. | 705/26 |
| 6,643,641 B1 * | 11/2003 | Snyder | 707/10 |
| 6,766,315 B1 * | 7/2004 | Bratsos et al. | 707/10 |
| 6,772,146 B2 * | 8/2004 | Khemlani et al. | 707/10 |
| 6,820,076 B2 * | 11/2004 | Bailey et al. | 707/3 |
| 6,988,138 B1 * | 1/2006 | Alcorn et al. | 709/225 |
| 6,990,534 B2 * | 1/2006 | Mikhailov et al. | 709/250 |
| 7,089,239 B1 * | 8/2006 | Baer et al. | 707/6 |
| 7,260,564 B1 * | 8/2007 | Lynn et al. | 707/10 |
| 7,546,295 B2 * | 6/2009 | Brave et al. | 707/10 |
| 2001/0051980 A1 * | 12/2001 | Raciborski et al. | 709/203 |
| 2002/0049713 A1 * | 4/2002 | Khemlani et al. | 707/1 |
| 2002/0075302 A1 * | 6/2002 | Simchik | 345/745 |
| 2002/0111934 A1 * | 8/2002 | Narayan | 707/1 |
| 2002/0112000 A1 * | 8/2002 | Itoh | 709/203 |
| 2002/0138556 A1 * | 9/2002 | Smithline et al. | 709/203 |
| 2003/0046289 A1 * | 3/2003 | Balasubramanian et al. | 707/10 |
| 2003/0050927 A1 * | 3/2003 | Hussam | 707/5 |
| 2003/0126558 A1 * | 7/2003 | Griffin | 715/513 |
| 2003/0187706 A1 * | 10/2003 | Buchmiller et al. | 705/7 |
| 2003/0200155 A1 * | 10/2003 | Ouchi | 705/27 |
| 2003/0227487 A1 * | 12/2003 | Hugh | 345/777 |
| 2004/0107415 A1 * | 6/2004 | Melamed et al. | 717/124 |
| 2004/0122915 A1 * | 6/2004 | Saare et al. | 707/10 |
| 2005/0114367 A1 * | 5/2005 | Serebrennikov | 707/100 |
| 2007/0150465 A1 * | 6/2007 | Brave et al. | 707/5 |

OTHER PUBLICATIONS

Archive.org, "Dynix Vision—Horizon Information Portal", Dec. 13, 2003, <http://web.archive.org/web/20031213154817/http://www.dynix.com/about/vision/hiportal.asp>.*

Wittmann-Regis, "International Preliminary Report on Patentability of PCT/EP2004/004148", Apr. 24, 2006, English Translation.*

Gralla et al., "How the Internet Works", Dec 1999, Que, Millenium Ed., p. xi,12-15, 162-169.*

Epixtech, "iPac System Administrator's Guide", Jan. 9, 2002, Epixtech Inc., Version 2.0, pp. 3-100, 3-101, 3-102, 3-104, 4-19, 4-20, 4-21, 4-22, 4-23, 4-24, 4-28, 4-33, 4-34, 4-35, 4-36, 4-37, 4-38, 4-39, 4-40, 4-41, 4-42, 4-43, 4-44, 4-45, 4-46, 4-47, 4-48, A-4, A-5, A-6.*

Archive.org, <<http://web.archive.org/web/20031125045256/http://demo.dynix.com>>, Nov. 2003, Retrieved Nov. 13, 2007 from Archive.org.*

Gilmartin et al., DYNIX: A Guide for Librarians and System Managers, Dec 1992, Ashgate Pulbishing Co., England, p. 2-7, 142-151, 154-167, 188-189.*

Susan M Johns (2002). Viewing the sunrise: iPac 2.0 accessibility. Library Hi Tech, 20(2), 148. Retrieved Nov. 16, 2007, from ABI/INFORM Global database. (Document ID: 236053291).*

Dynix, "Horizon Information Portal System Administrator's Guide for Horizon", Mar. 31, 2004, Dynix Corp, Version 3.0, 414 pages.*

Sample PTO STIC library card catalog page, <Retrieved Jun. 24, 2008>.*

Sample Search History Page from Alexandria City Library, Dec. 31, 2004, <Retrieved Jun. 24, 2008>.*

Abdelnur et al, "Java Portlet Specification Version 1.0", JSR-168, Oct. 7, 2003, p. 1-132.*

Soumen Chakrabarti, Sandeep Srivastava, Mallela Subramanyam and Mitul Tiwari, "Using Memex to archive and mine community Web browsing experience". Computer Networks, Elsevier Science Publishers B.V., Amsterdam, NL, vol. 33, No. 1-6. Jun. 2000, pp. 669-684, XP004304800.

* cited by examiner

METHOD AND ARRANGEMENT FOR SETTING UP AND UPDATING A USER INTERFACE FOR ACCESSING INFORMATION PAGES IN A DATA NETWORK

CROSS REFERENCE TO RELATED APPLICATIONS

This application is the US National Stage of International Application No. PCT/EP2004/004148, filed Apr. 19, 2004 and claims the benefit thereof. The International Application claims the benefits of German application No. 10320711.2 filed May 8, 2003, both applications are incorporated by reference herein in their entirety.

FIELD OF THE INVENTION

The invention relates to a method for setting up and updating a user interface for accessing information pages in a data network, and to an arrangement for carrying out the method.

SUMMARY OF THE INVENTION

Information pages in a data network, particularly the web pages on the Internet, are accessed by a user by inputting the address of the respective information page in a display program ("browser"). The address which is input is used by the display program to set up a connection to the web server on which the information page in question is stored, and as a result the information page is transmitted to the user's computer and its content is displayed there using the display program.

A displayed information page may contain "links". Links are display elements which reference (other) information pages and whose use allows these information pages to be called without the need for the addresses of these (other) information pages to be indicated to the display program, again manually.

An alternative to manual address input for accessing information pages is the use of a "search engine". A search engine can usually itself be operated using an information page and comprises at least one input field for search terms. The search engine checks a number of (ideally all) information pages to determine whether some or all search terms are contained in the content of these information pages. As search result, the search engine provides the user with an information page containing links which can be used to access some or all of the information pages found.

Another way of accessing information pages is to call them using a special user interface, the "portal page". A portal page is an information page which is provided by a portal operator and which already contains a number of links which the portal operator assumes might be useful for the user. In this case, an operator can also create various portal pages for different users or different groups of users, at least some of said portal pages being able to be changed by the user himself or by the users themselves.

Accessing information pages by virtue of the user inputting the respective address has the associated drawback that the user always needs to know the correct address of the desired information page. This problem is partly solved by virtue of the user being able to use a search engine, as described above. However, the use of search engines has the drawback that only information pages whose content includes the use of precisely those terms which the searching user has entered into the search engine's input field are found. Although when creating information pages it is possible to store additional keywords in a nondisplayed content area of the information page, the "HTML header", which can then be found by the search engines, these keywords also need to match the search terms in order for the information page in question to be able to be found.

The drawbacks described lead the user who is looking for information to use one of the previously described portal pages, which provides a number of relevant information pages, for example for a particular subject area.

In this case, however, it has been found to be a drawback that only information pages which have already been preselected beforehand by the provider of the portal page or have been added by the user of the portal page in the course of retrospective adaptation can be accessed by means of links in this case. A portal page thus takes the user to the desired information page and hence to the desired content only if suitable links have been set up by the operator of the portal page or by a user beforehand. In this case, the number of links which can be set up is limited, merely for the sake of clarity, which means that links which are not relevant and links whose associated information page no longer exists ("dead links" or "expired links") need to be removed. In addition, on the Internet, in particular, new information pages which are potentially important to the user are frequently created afresh and need to be regularly recorded, evaluated and—depending on their importance—referenced ("linked") on the portal page by the operator of the portal page. The complexity and hence costs for maintaining a portal page thus increase proportionally to the number of links displayed.

In brief, the operation of a portal page is thus associated with a high level of predominantly manual complexity which also needs to be put into operation on a regular basis in order to maintain the quality of the portal page.

It is the object of the invention to propose a method which reduces the complexity for setting up and updating a user interface for accessing information pages and to propose an arrangement which can be used to set up and update the user interface in a simple manner.

This object is achieved by the claims.

For the method, the solution provides for the information pages to have a respective associated content data record created for them which stores features which describe the respective content stored on the information page. To determine the selected information pages, a user data record having features which describe a sought content is created. The content data records are respectively compared with the user data record to determine the degree of match, and information pages for which the degree of match between the respective content data record and the user data record achieves and/or exceeds a previously defined threshold are displayed on the user interface by display elements as selected information pages. The effect achieved by this is that the user interface displays information pages whose content is of interest to the user.

For the arrangement, the solution provides for the information pages to have a respective content data record stored for them on the web server, said content data record describing the content which can be accessed using the respective information page, for the content data record to be able to be accessed by the portal server, for the portal server to store a user data record which describes a content sought by the user, for the portal server to have a comparison device which compares content data records with the user data record to determine the degree of match, and for the portal server to be in a form such that information pages for which the comparison result achieves and/or exceeds a previously defined minimum match are displayed by elements on the user interface. Such an arrangement provides the user with a user interface having information pages which are matched to his needs.

Advantageous developments of the invention are described in the dependent patent claims.

If the selected information pages are checked cyclically for their accessibility and if, in cases in which one of the information pages checked can no longer be access, the display element for this information page is removed from the user interface, no inactive links are displayed on the user interface.

If the comparison is repeated at intervals of time and the result of the repeated comparison is used to update the user interface, newly added information pages with content data records are also taken into account.

If the user data record is updated, after the update the comparison is performed again, and if the new comparison result is used to determine the selected information pages again, the user interface adapts itself to suit changed requirements by the user.

Portal servers which have just been turned on can also take into account a large quantity of information pages in the comparison if content data records are ascertained and stored by interrogating a database containing content data records and/or by means of a search, and if said content data records are used for the comparison with the user data record.

The data records are particularly simple to evaluate if each content data record and the user data record are respectively created as a structured document, and if the content data record comprises the address of its associated information page. In that case, the information page corresponding to the content data record is also particularly simple to find.

If each content data record (IDS) and the user data record are created in XML format, and if the structure of the content data records and of the user data record is respectively stipulated in a description data record, a generally known and easy-to-handle data format is used, with the use of the description data record also allowing differently structured data records to be compared with one another.

Comparisons can be made particularly easily if the same respective structure is used for the content data records and for the user data record.

The user is provided with a clear illustration if the selected information page which has been used most to date is displayed at a prioritized position on the user interface.

If the selected information page whose associated content data record has the best match with the user data record is displayed at a prioritized position on the user interface, the user can obtain the information which is most likely to be useful to him in particularly simple fashion.

If the information pages used are web pages, and if the web pages can be accessed using addresses associated therewith, and if the web pages and the content data records are stored on at least one web server, and if the content data records are retrieved using data record addresses which are respectively associated therewith, the method may advantageously be used on the Internet or in data networks which are similar to the Internet.

The user is provided with a trusted mode of operation if the user interface used is an information page in the form of a portal page, and if the portal page is provided by a portal server.

If a proxy server is used in the data network, the proxy server reads in the information pages whose associated addresses are transmitted to it and the proxy server buffer-stores the information pages which have been read in and sends them to the user, then access to frequently required information pages is particularly effective.

Accessing information pages which have been found is particularly easy if the display elements of the selected information pages are each in the form of a link which is linked to the address of the respective selected information page, accessing the link involves the address of the associated information page being transmitted to the proxy server, and the proxy server loads this information page and sends it to the user.

If transmitting the information page to the proxy server involves the data record address of the content data record associated with this information page likewise being transmitted to the proxy server, if the proxy server transmits this data record address to the user interface, and if the user interface loads the content data record associated with this data record address and stores it for the comparison, the volume of content data records which can be used for the comparison increases and hence so does the probability of comparison results with a high degree of match.

Exemplary embodiments of the inventive method are explained below with reference to the drawings and are used simultaneously to explain an exemplary embodiment of the inventive arrangement.

A most requested web page is displayed at a prioritized or prominent position on the portal page.

DETAILED DESCRIPTION OF THE INVENTION

Figure 1:
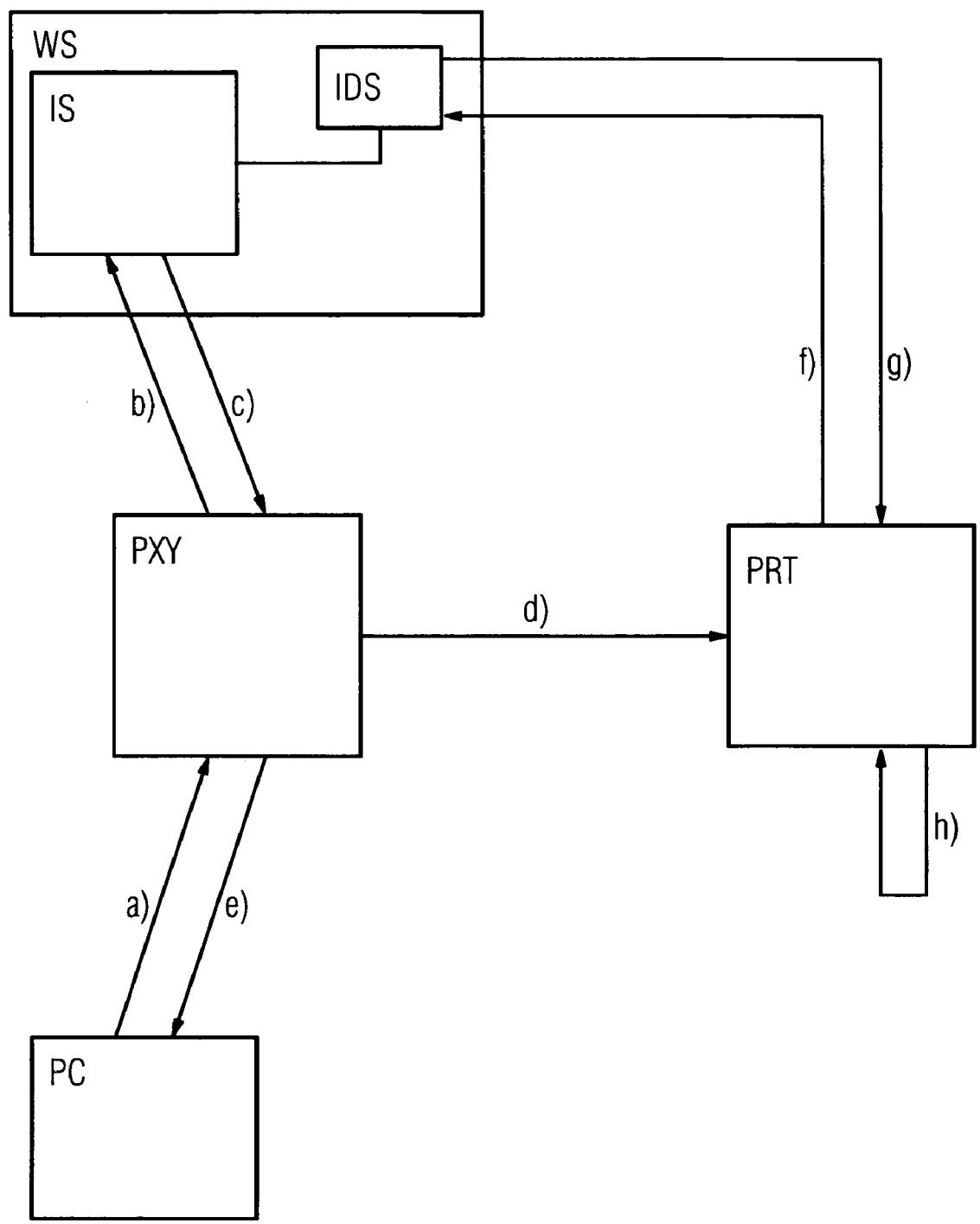
FIG. 1 shows a schematic illustration of an arrangement for displaying a portal page in which a portal server is provided with information about information pages.

FIG. 1 shows components of a data network (not shown in full here) which are able to interchange information with one another via the data network. In this case, there is a computer PC which is equipped with a display program for information pages, a "web browser". The web server WS is used to store information pages IS and at the same time to store content data records IDS which are respectively associated with the information pages IS. The linking element between the web server WS and the computer PC is the proxy server PXY, which loads the information pages IS requested from the web server WS by the web browser on the computer PC from the web server, buffer-stores them and forwards them to the computer PC. Finally, the data network contains a portal server PRT which, as the user interface for the user of the computer PC, creates or holds specific information pages and sends them to the computer PC. The arrows between the individual components symbolize challenge and response messages which are interchanged between the components and which are used to explain the exemplary embodiments below. To this end, the arrows are identified by letters a) ... p).

Figure 2:
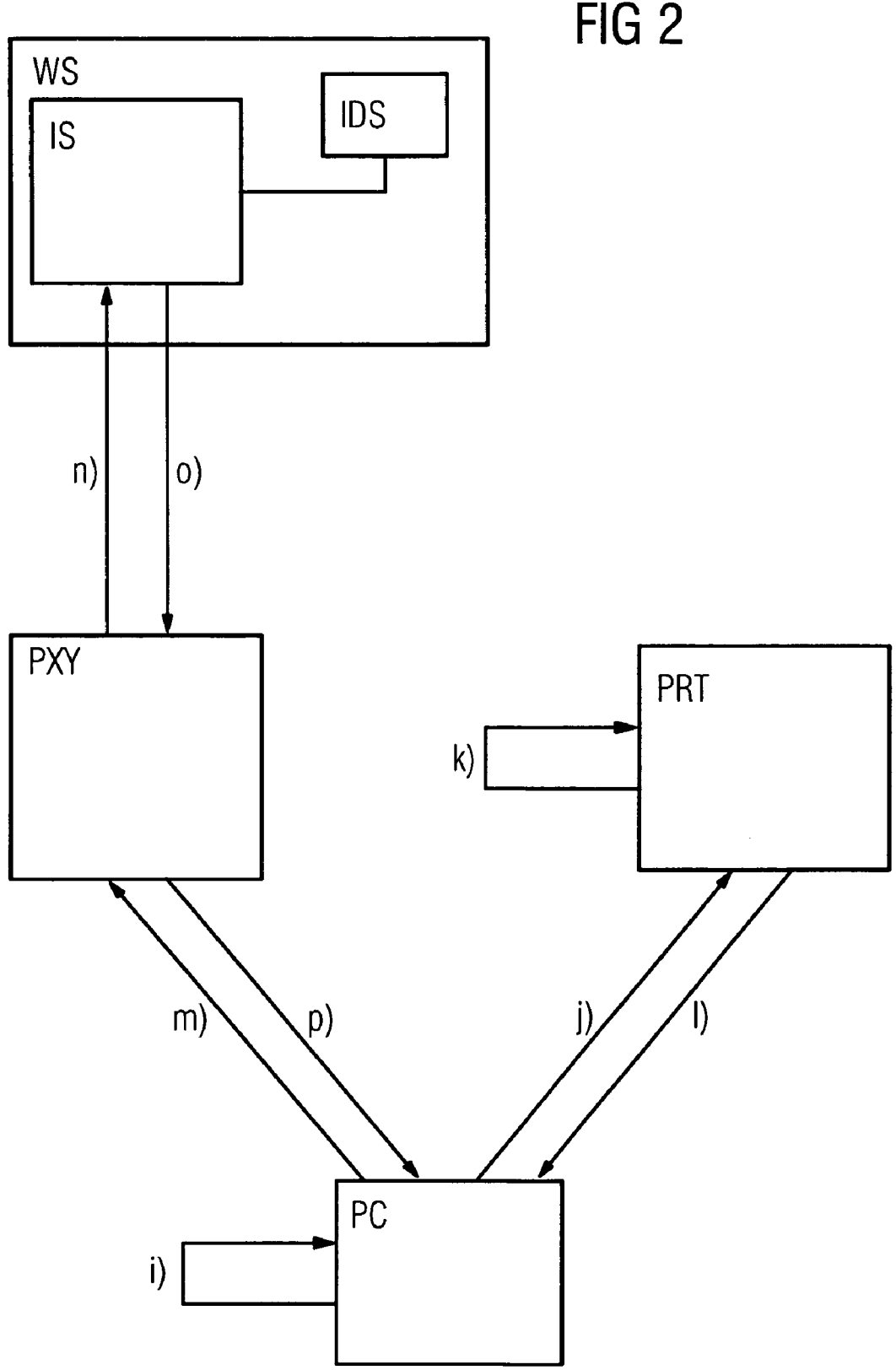
FIG. 2 shows a schematic illustration of the arrangement which is used to evaluate information about information pages in order to create the portal page.

The data network may naturally also contain a plurality of instances of all of the components; in particular, smaller data networks also contain a multiplicity of information pages IS, a plurality of computers PC and users. For reasons of clarity, however, only single instances of all components are shown in FIGS. 1 and 2.

The web server WS, the proxy server PXY and the portal server PRT are each independent appliances in this case; it goes without saying that they may also be installed as logical entities together on a piece of hardware, however.

The data store in the web server WS stores web pages as information pages IS, said web pages being in HTML (Hypertext Markup Language) format in this case and storing various contents. A data area which is not to be displayed to the user ("HTTP header") in an information page IS stores the address of the content data record IDS associated with this information page IS. In the present example, this content data record IDS (also called "wsmid"="web side meta information document") is stored on the same web server WS as the associated information page IS; it goes without saying that it may also be stored on another addressable component of the data network. The content data record IDS is created by the creator of the information page IS in XML (Extensible Markup Language) format, with the structure of this content data record, that is to say details about the data fields provided in this content data record IDS, being set down in a description data record which is likewise stored on the web server WS. Such description data records are also known as DTDs (Document Type Definition) for the XML documents; they are accordingly also called "wsmid—DTD" in this case.

In the present case, the content data record has been created by the creator of the information page IS. This means that there is a high level of probability that the content data record will precisely describe the content of the information page IS. Alternatively, the content data record may also be created by a third entity, for example by a service provider specializing in this field or by an automatic device programmed specifically for this task.

The portal server PRT has a database which stores copies of content data records IDS. These copies of the content data records IDS are compared, as described later in detail, with another data record, the user data record, in order to configure the user interface for the user. The database in the portal server PRT is to this end provided with these very copies of the content data records IDS in the course of operation. This process is described below with reference to FIG. 1.

The display program installed on the computer PC is used to load and display information pages IDS which are stored on the web server WS. To this end, the display program and hence the computer PC send the proxy server PXY a request message A which comprises the address of the desired information page IS. The proxy server PXY then checks whether this desired information page IS is already stored in its internal memory (cache) and, if so, whether the "expiry date" for this copy has not yet been reached. In the present example, there is not yet a copy of the information page IS in the cache memory in the proxy server PXY, which means that the latter sends a request message b), similar to the message a), to the web server WS in order to retrieve the relevant information page IS. The web server WS responds to the proxy server PXY with a response message c) which comprises the desired information page IS. As already explained, the header on the information page IS comprises the address statement for the content data record IDS associated with this information page IS. In this case, the content data record IDS, for its part, comprises the address of its associated information page IS. The proxy server PXY now uses a message d) to send the address of the content data record IDS to the portal server PRT; the content of the information page IS itself is not sent to the portal server PRT in this case, however. To send the address of the content data record IDS, an information channel reserved for this purpose is used. In data networks with a plurality of portal servers PRT, the address of the content data record can be sent to a plurality of or all portal servers PRT. The proxy server PXY now sends the information page IS loaded from the web server to the computer PC in a response message e), and the computer PC displays this page using the display program installed thereon.

Following receipt of the message d), the portal server PRT checks whether the content data record with the data record address which has been sent is already stored in its database. This is not yet the case in the present example, which means that the portal server PRT generates a request message f) with the address of the content data record IDS and sends it to the web server WS. The latter uses a response message g) to send the content data record IDS to the portal server PRT, which evaluates the information received with this message g) in a processing process h). In this case, the received content data record IDS is conditioned such that the data fields it contains are stored as searchable objects in the database in the portal server PRT. This is done with the aid of the description of the structure of the content data record IDS, said description having been sent to the portal server PRT likewise by the web server WS in the response message g) in the form of the wsmid—DTD.

Since, as mentioned at the outset, a data network based on the invention stores and uses a multiplicity of information pages IS, the database in the portal server PRT is filled with a growing number of content data records IDS in the course of operation until—ideally—the content data records IDS of all the information pages IS are stored, provided that each information page IS also has a content data record IDS in the first place.

To provide the user of the computer PC with comprehensible access to a limited number of information pages IS, a user interface adapted to suit the display program, a "portal page", is created for display on the display program and is displayed. This process is shown schematically in FIG. 2 and is explained below with reference to this figure.

The user of the computer PC activates a command in the display program in order to display a portal page as a user interface. The display program establishes from brief data interchange with the portal server PRT whether the portal server stores a portal page provided for this user. This is not the case in the present example, which means that the display program asks the user to input information about the desired content which is to displayed for selection on the new portal page which is to be created. This can be done by the user, for example by activating selection menus or else by means of text input. From these details, the display program creates a user data record, which in this case is likewise stored in XML format and which likewise has an associated description data record (DTD). In the present example, the description data record, which is associated with the user data record, is identical to the description data record wsmid—DTD of the content data records IDS; it goes without saying that these description data records may also differ from one another, however.

The user data record now comprises, in the form of keywords, various preferences for the user, for example the language or the languages in which the information pages IS to be displayed can be written, headwords which need to be present in the title or in the content of the information pages IS, and similarly those which must not be present etc. In this case, depending on the inputs by the user, some or all fields of the user data record are filled with content. The user data record is now transmitted to the portal server PRT from the computer PC in a request message j), and the portal server PRT compares it or the data fields contained in it with the data fields in the content data records IDS which are stored in the database in the portal server PRT. The comparison results produce a list of hits which is able to be sorted in various ways, for example according to the degree of match between all data fields, according to the statistically most frequent use of the respective information pages, age of the information page IS etc. The portal server now uses this list of bits to generate a specific information page, namely the portal page. Since the portal page is compiled afresh upon each challenge, the process is also referred to as "dynamic generation". For each successful comparison, this portal page now comprises a link to the respective information page IS found. The portal page is now transmitted from the portal server PRT to the computer PC in a response message 1), and the computer PC displays it using the display program. The links displayed on the portal page are respectively provided with the title of the respective information page IS, which means that the user now selects and clicks on one or more of the displayed information pages IS from the displayed titles.

The computer PC now uses the links which have been clicked on to send a request message m), which comprises the address of the desired information page IS, to the proxy server PXY. The proxy server PXY in turn forwards the address in a further request message n) to the web server WS, which uses a response message o) to send the requested information page IS to the proxy server PXY, with the latter for its part sending the information page IS to the computer PC in the response message p). The display program on the computer PC now displays this information page IS to the user.

If one of the information pages IS is deleted or substantially changed by the web server WS, the content of the database in the portal server PRT does not change automatically at first. This can result in the user being presented with a portal page which does not have the correct content. For this reason, the content data records IDS are deleted from the database after a preset expiry period has elapsed. Alternatively, after the expiry period has elapsed, it is also possible for a connection—not shown here—from the portal server PRT to the web server WS to be set up, within which the content data record IDS in question is transmitted to the portal server again. Changes in the content data record IDS are incorporated into the database in the portal server PRT in this case, or, if the information page IS in question and the associated content data record IDS have been deleted, the data record in question can also be deleted from the database in this case. Such checks on the database and on the content data records IDS stored therein are preferably made at low-traffic operating times in the data network.

If the user uses the display program on his computer PC to request "his" portal page, the display program checks, as described above, whether such a portal page has already been stored for the user on the portal server PRT. If this is not the case, this portal page is created afresh using the user data record which the user inputs in the course of fresh creation. If there is already a portal page, however, then the user is at this point provided with the opportunity to update the previously stored user data record, whereupon the portal page is set up afresh in line with the method described above. In this case, the user can decide whether to maintain or delete the links which have been present to date.

The invention claimed is:

1. A method for setting up and updating a portal page for an end user to access web pages in a data network via the portal page, comprising:
   receiving a first request message from a computer of the end user, the request message comprising an address of a web page to be accessed by the end user;
   sending a second request message to a web server in order to retrieve the requested web page;
   receiving a response message from the web server, the response message including the requested web page, the requested web page includes an address of a content data record in a non-displayable area of the web page, and
   the content data record including information pertaining to the content of the retrieved web page;
   accessing the content data record via the received address of the content data record in response to receiving the response message;
   storing data fields of the accessed content data record;
   receiving from the end user a user data record having features which describe a sought content for determining the web page;
   comparing the stored data fields with the received user data record to determine a degree of match;
   dynamically generating a portal page including a displayable link to the web page in response to the degree of match at least meeting a previously defined threshold; and
   sending the dynamically generated portal page to the computer of the end user in order to be displayed.

2. The method as claimed in claim 1, wherein the web page is checked cyclically for accessibility, and the link for the web page is excluded from the dynamically generated portal page in response to the page not being accessible.

3. The method as claimed in claim 1, wherein the comparison is repeated at intervals of time, and wherein the result of the repeated comparison is used to generate the portal page.

4. The method as claimed in claim 1, wherein the user data record is updated, wherein after the update the comparison is performed again, and the portal page re-generated.

5. The method as claimed in claim 1, wherein the content data record and the user data record are each a structured document, wherein the web page is associated via including the address of the content data record, and wherein the content data record comprises the address the associated web page.

6. The method as claimed in claim 5, wherein the content data record and the user data record are created in XML format, and wherein the structure of the content data record and of the user data record is respectively stipulated in a description data record.

7. The method as claimed in claim 5, wherein the same respective structure is used for the content data records and for the user data record.

8. The method as claimed in claim 6, wherein the same respective structure is used for the content data records and for the user data record.

9. The method as claimed in claim 1, the receiving a first request message, the sending a second request message and receiving the response message are repeated for each of a plurality of web pages requested by the end user, wherein a plurality of displayable links associated with the requested web pages are displayed on the portal page.

10. The method as claimed in claim 9, wherein a most requested web page is displayed at a prioritized or prominent position on the portal page.

11. The method as claimed in claim 9, wherein the associated web page for a content data record having the best match with the user data record is displayed at a prioritized or prominent position on the portal page, wherein the web page is associated via including the address of the content data record.

12. The method as claimed in claim 9, wherein the web pages and the content data records are stored on at least one web server, and wherein the content data records are retrieved using data record addresses which are respectively associated therewith.

13. The method as claimed in claim 1, wherein the non-displayable area of the web page is included in a HTTP header portion of the web page.

14. A system for setting up and updating a portal for an end user to access web pages in a data network via the portal page, comprising:

a web server appliance comprising:

a web page having an address of an associated content data record, and the associated content data record that describes a content on the respective web page;

a proxy server appliance communicatively coupled to the web server appliance and to a computer of the end user, the proxy server appliance having a storage area for storing a copy of the web page;

a portal server appliance that manages a dynamically generated portal page and communicatively coupled to the web server appliance and to the proxy server appliance, the portal server appliance comprising:

a database that stores data fields of the associated content data record, a comparison unit that compares the data fields with a user content data record from the end user computer, wherein the proxy server appliance receives a request for the web page by the end user computer and determines when the web page is stored in the proxy server appliance, wherein the proxy server appliance retrieves the web page from the web server appliance and subsequently stores the web page in response to the web page not being stored, wherein the proxy server appliance sends the address of the associated content data record to the portal server appliance in response to retrieving the web page, wherein the portal server appliance retrieves the associated content data record from the web server appliance and stores the data fields of the retrieved record in the database, wherein the portal server appliance receives the user data record from the end user computer and the comparison unit compares the user data record with the data fields in the database, wherein in the portal page is dynamically generated to include a displayable link to the web page when the comparison result at least meets a previously defined minimum.

15. The system as claimed in claim 14, wherein the portal server appliance retrieves the associated content data record in response to information in the associated content record not being stored in the portal server database.

16. The system as claimed in claim 15, wherein the information is deleted in portal server database after a preset expiry time.

17. The system as claimed in claim 14, wherein the web page includes a HTTP header portion and the HTTP header portion includes the address of the associated content data record such that the address of the associated data record is not displayed.

* * * * *